United States Patent
Clodfelter et al.

(10) Patent No.: US 6,561,369 B1
(45) Date of Patent: *May 13, 2003

(54) NECK FINISH FOR A CONTAINER

(75) Inventors: Christopher Clodfelter, Evansville, IN (US); Douglas Sprick, Evansville, IN (US)

(73) Assignee: Rexam Medical Packaging Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/125,145

(22) Filed: Apr. 18, 2002

Related U.S. Application Data

(62) Division of application No. 09/440,864, filed on Nov. 16, 1999, now Pat. No. 6,386,380.

(51) Int. Cl.$^7$ ................................................ B65B 7/28
(52) U.S. Cl. ........................................................ 215/44
(58) Field of Search ............................. 215/44; 425/525

(56) References Cited

U.S. PATENT DOCUMENTS

| | | |
|---|---|---|
| 1,499,612 A | 7/1924 | Hammer |
| 1,577,020 A | 3/1926 | Hammer |
| 1,841,980 A | 1/1932 | Plattring |
| 1,866,770 A | 7/1932 | Hilgenberg |
| 2,169,686 A | 8/1939 | Fabrice |
| 2,589,005 A | 3/1952 | Welhart |
| 3,511,403 A | 5/1970 | Braun |
| 4,007,848 A | 2/1977 | Snyder |
| 4,084,717 A | 4/1978 | King |
| 5,366,774 A | 11/1994 | Pinto et al. |
| 5,423,441 A | 6/1995 | Conti |
| 5,431,291 A | 7/1995 | LaBombarbe, Jr. |
| 5,553,727 A | 9/1996 | Molinaro |

FOREIGN PATENT DOCUMENTS

| | | | |
|---|---|---|---|
| EP | 100 375 A2 | 2/1984 | |
| JP | 56157333 A | 12/1981 | ........... B29C/49/50 |

OTHER PUBLICATIONS

Injection Molding Handbook, Rosato et al, pp. 198 and 199 and Figure 7–24, Von Nostrand Reinhold Company, Inc. 1986.

Primary Examiner—Robert Davis
(74) Attorney, Agent, or Firm—John F. Salazar; James E. Cole; Middleton Reutlinger

(57) ABSTRACT

A neck finish of a container which includes a helical thread encircling the neck wherein said thread is provided with a pair of recesses spaced apart 180° and in cooperative engagement with recess forming fingers in a pair of cooperating horizontally movable mold halves.

6 Claims, 3 Drawing Sheets

NECK FINISH FOR A CONTAINER

This application is a divisional of U.S. patent application Ser. No. 09/440,864 filed Nov. 16, 1999 and now U.S. Pat. No. 6,386,390.

BACKGROUND OF THE INVENTION

This invention relates to a neck finish on a container having an anti-thread distortion feature and more particularly relates to a neck finish for a container having a clearance designed into a bottle thread to allow horizontal withdrawal of bottle thread molding surfaces during manufacture.

Currently, in the forming of containers of plastic, glass, or other known materials, an extruded parison or injection molded preform is initially formed. In the use of plastics, materials such as polyethylene terephthalate (PET) or High Density Polyethylene (HDPE) are most commonly found. In the blow molding process for a container, the preform is positioned within a mold cavity which is defined by the coming together of two mold halves and the preform is held in place by the neck finish between the mold halves. In the molding process the preform is longitudinally stretched, usually by a push rod, and then laterally expanded by injection of a blowing gas or fluid into the interior of the preform. Upon completion of the molding process the mold halves are moved apart horizontally and in many instances during the separation of the mold surface, and particularly in the neck finish, the molding surfaces pull, tear, or rip the helically-shaped formed bottle container neck threads. A common problem found in the forming of containers utilizing steep-pitch threads is distortion of the threads upon removal of the container from the mold.

SUMMARY OF THE INVENTION

It is an object of the present invention to provide a neck finish for a bottle container including an anti-thread distortion feature.

It is another object of the present invention to provide a neck finish for a container which includes a clearance designed into a bottle thread to allow horizontal withdrawal of the bottle thread molding surfaces during the molding operation of a container without pulling, tearing, ripping, or otherwise deforming threads on the neck of the container.

It is yet another object of the present invention to provide a neck finish for a container which allows for the use of steep-pitch threads.

In accordance with the present invention, a blow molded container is formed from a parison. The neck finish of the container has been modified to assist in the separation of the mold upon the completion of the formation of a container without deforming the container thread profile. The neck finish is provided with a pair of recesses on opposed sides of the neck and also of the mold, each recess being disposed within a thread of the neck and in alignment with the direction of movement of the axially moveable mold sections which make up the container forming mold.

More particularly, the present invention provides a container with a neck portion having a first open end and an opposed second end opening into a body portion of the container. A helical thread of the type such as a steep-pitch helical thread or the like encircles the neck. The helical thread is provided for engagement with mating threads of a closure or container cap. A pair of recesses are provided within the helical thread wherein the recesses are spaced 180° apart. The recesses are formed by fingers in at least two axially movable mold sections. When the mold sections are joined together they form a mold cavity from which the container is formed.

BRIEF DESCRIPTION OF THE DRAWINGS

A better understanding of the invention will be bad upon reference to the following description in conjunction with the accompanying drawings in which like numerals refer to like a parts throughout the several views and wherein.

DETAILED DESCRIPTION OF THE PREFERRED EMBODIMENT

Figure 1:
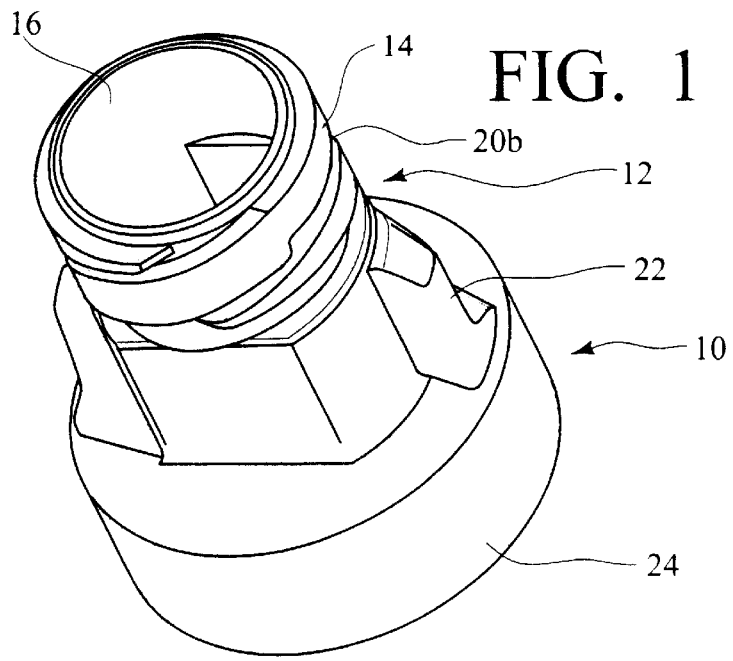
FIG. 1 is a perspective view of a neck finish of one preferred embodiment of the present invention.
Figure 2:
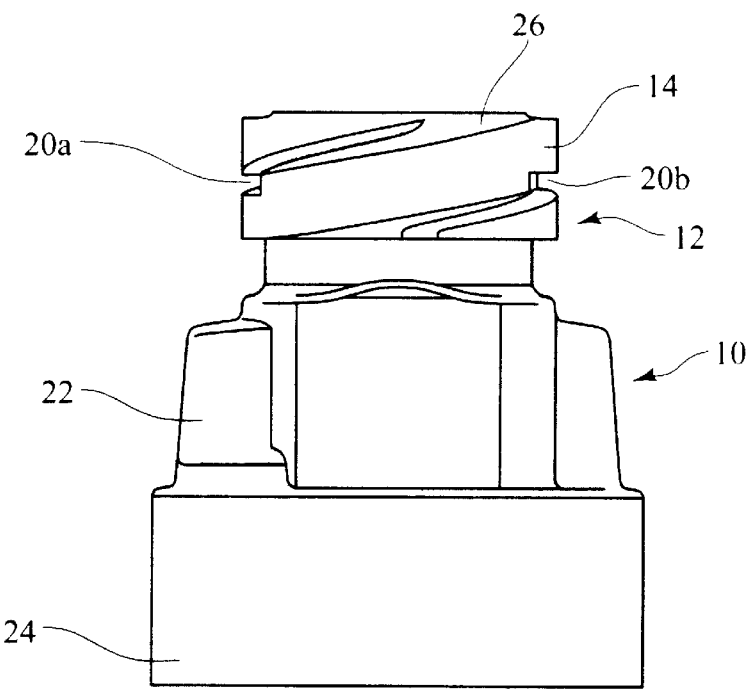
FIG. 2 is a side view of the neck finish of FIG. 1.
Figure 3:
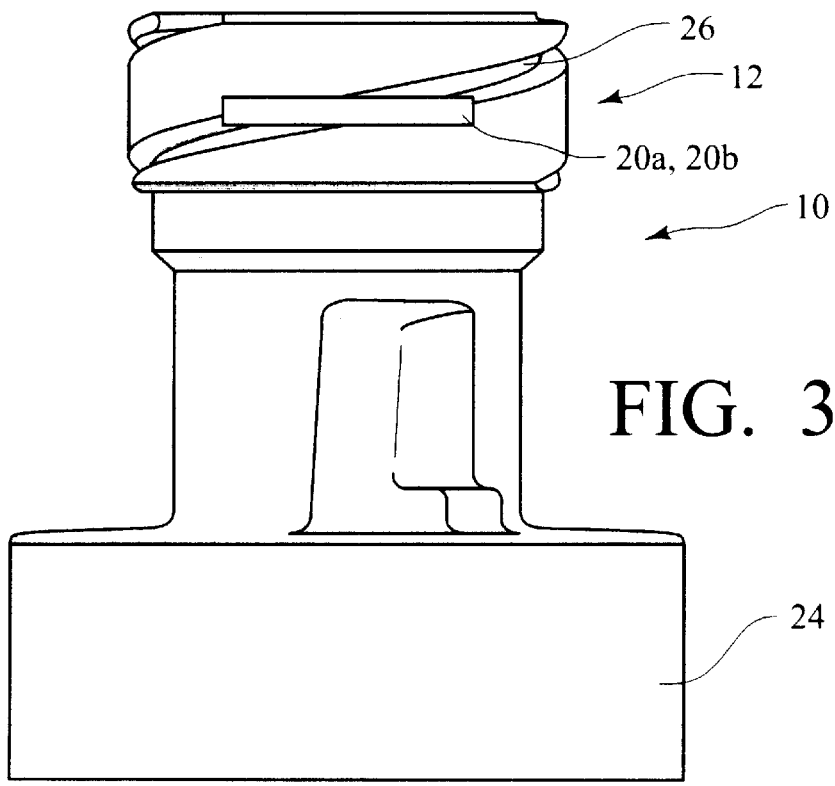
FIG. 3 is a side view of the embodiment of FIG. 1 wherein the container in FIG. 2 has been rotated 90°.
Figure 4:
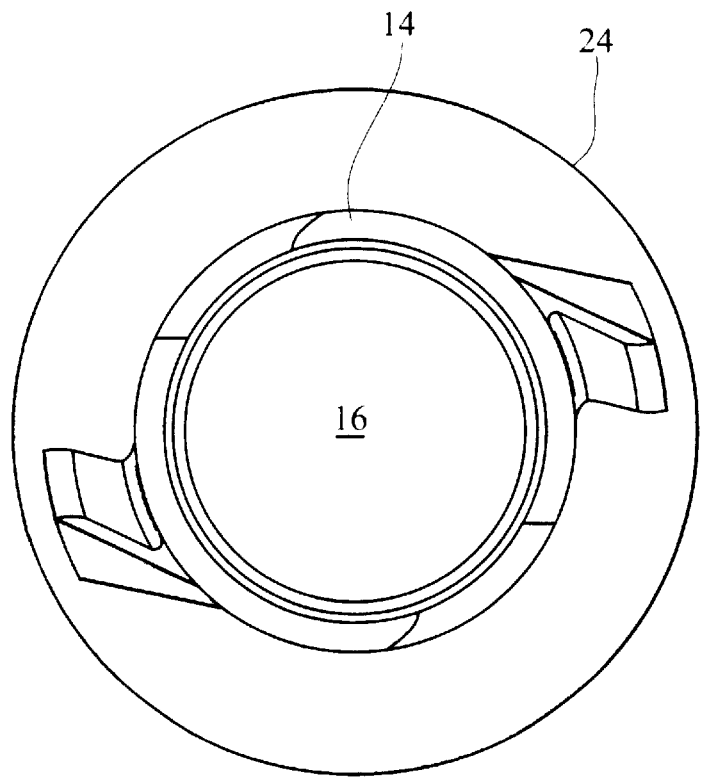
FIG. 4 is a top view of the container of FIG. 1.

As shown in FIGS. 1–4, a container 10 is made up of a neck portion 12 and a body portion 24. The neck 12 is provided with an open mouth 16 and an opposed opening into the body portion 24. Circumscribing the neck portion 12 is a helical thread 14 which is defined by a slot 26 which receives the thread of a closure or container cap (not shown). Disposed within the thread 14 is a pair of recesses 20a and 20b which are spaced from each other a total of 180°. The recesses 20a and 20b are in alignment with and formed by the fingers 32a, 32b, 32c, and 32d as shown in FIG. 5a. A latching lug 22 may also be provided for engagement with a mating latching lug on a closure (not shown).

Figure 5:
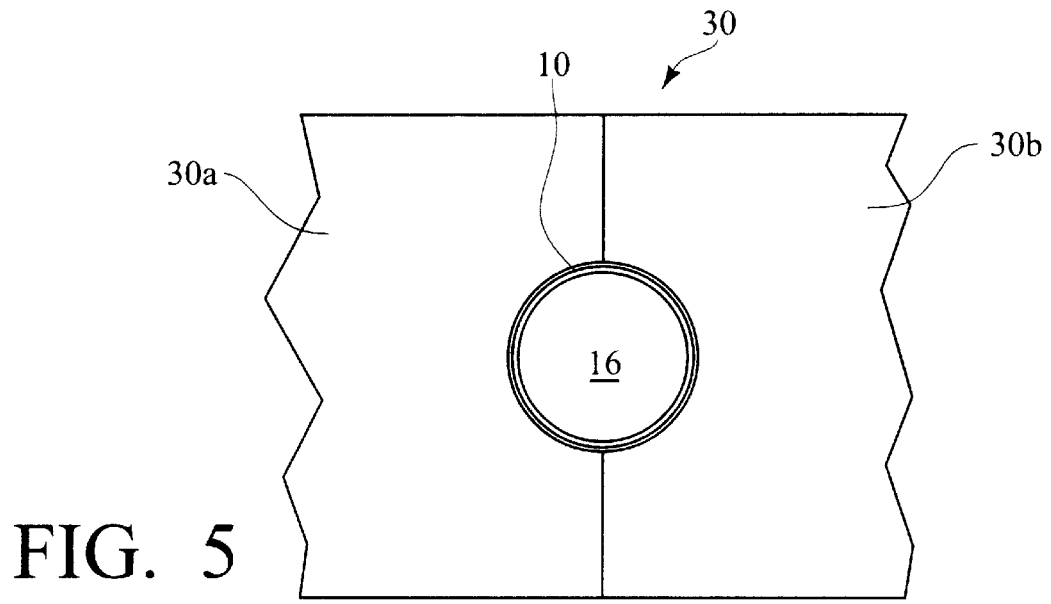
FIG. 5 is a top view of the container of FIG. 1 in a split mold.
Figure 5A:
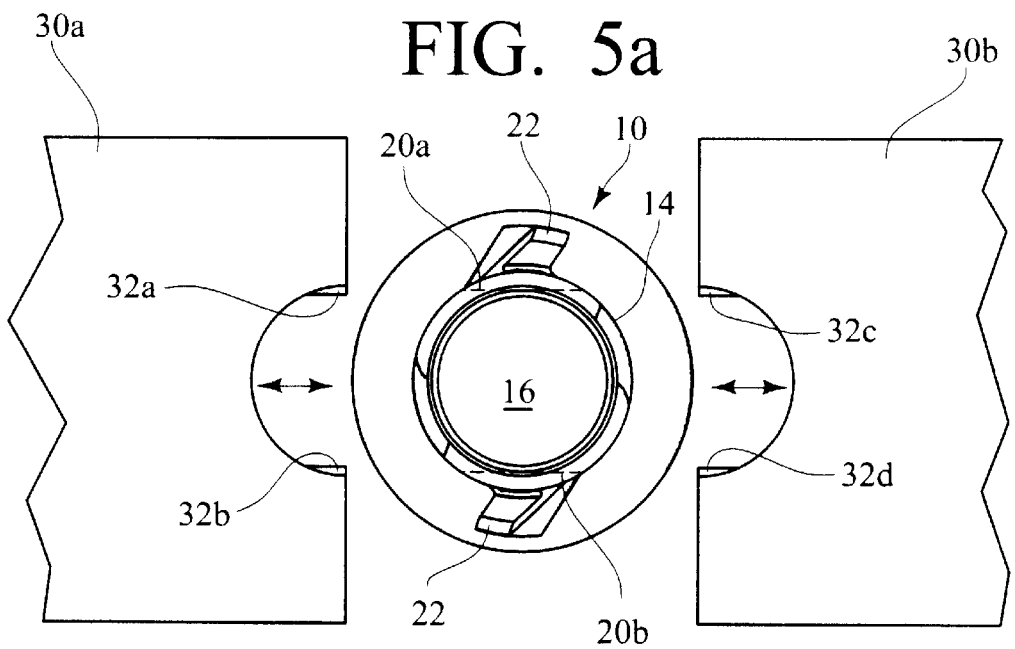
FIG. 5A is FIG. 5 with the split mold in a separated condition.

As shown in FIGS. 5 and 5a, a mold 30 of the preferred embodiment is comprised of only two sections which are, in fact, halves. One half is identifiable as 30a and the other as 30b. Molds 30a and 30b are horizontally movable by virtue of the fact that there are but two sections. When three or more sections are used, the mold sections move apart axially instead of horizontally. When the molds are in a closed position, as shown in FIG. 5, they define a cavity (not shown) for the mold of the body portion 24 of the container 10 and grasp the neck portion 12 therein and form the helical threads 14. Helical thread 14 has a pitch in the range of 0 to 8 threads per inch. As shown in FIG. 5a, the recessed portions 20a and 20b in the helical thread 14 are formed by the fingers 32a, 32b, 32c and 32d of the mold halves 30a and 30b, respectively. The horizontal recess formed by recessed portions 20a and 20b comprise a first notch disposed on a first side of the slot and a second notch disposed on a second side of the slot with the first notch juxtaposed relative to the second notch so as to horizontally traverse the slot.

In the preferred embodiment, a container 10 with a neck finish 12 of the present invention is formed by placing a parison of a selected moldable material, such as, for example polyethylene terephthalate (PET), or High Density Polyethylene (HDPE), within a cavity of the mold. The preferred embodiment also creates the mold cavity upon the bringing together of the mold halves 30a and 30b, as shown in FIG. 5. Alternate embodiments using more than two mold sections create a mold cavity when their mold sections are brought together axially. A vertically molded core (not shown) of a molding device is inserted into the cavity thereby engaging with the parison.

In a form of compression-molding, the parison is next formed into a preselected configuration defined by the spatial relationship of the core and the cavity in the mold 30 resulting in the formation of a container 10. Additionally, a blow-molding process can be used to create the container 10.

After the container 10 has been formed, the mold halves 30*a* and 30*b* are then horizontally separated as the mold halves 30*a* and 30*b* move horizontally away from the container. Furthermore, at the initial separation of the mold halves, the fingers 32*a*, 32*b*, 32*c* and 32*d* form the recesses 20*a* and 20*b* in the helical thread 14 in order to allow clearance of the mold from the neck finish and avoid distortion of the helical thread 14, even if the helical threads 14 are of a steep pitch, as the halves 30*a* and 30*b* separate.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A container and container neck combination, comprising:
    a container neck having a first open end and an opposed second end opening into a body portion of a container;
    a slot formed in said container neck and being adapted to receive a thread from a complementary closure; and
    a first and a second recess, said first recess disposed on a first side of said container neck and said second recess disposed on a second side of container neck, said first recess being juxtaposed relative to said second recess so as to horizontally traverse said slot encircling said container neck.

2. A plastic container neck, comprising:
    a container neck having a first open end extending outward from a body portion of a container;
    a slot formed in said container neck and being adapted to receive a thread from a complementary closure; and
    a first and a second recess, said first recess disposed on a first side of said container neck and said second recess disposed on a second side of container neck;
    wherein said first recess horizontally traverses said slot on said first side of said container neck and wherein said second recess horizontally traverses said slot on said second side of said container neck.

3. The container neck of claim 2, wherein said neck has a thread pitch between 0 and 8 threads per inch.

4. The container neck of claim 3 wherein said thread pitch is two threads per inch or higher.

5. A container and container neck combination, comprising:
    a container neck having a first open end and an opposed second end opening into a body portion of a container;
    a slot formed in said container neck and being adapted to receive a thread from a complementary closure; and
    a first and a second recess, said first recess disposed on a first side of said container neck and said second recess disposed on a second side of container neck, said first recess being juxtaposed by 180 degrees relative to said second recess, said first and said second recess horizontally traversing said slot encircling said container neck.

6. A container having pitched threads, comprising:
    a container neck having a first open end and an opposed second end opening into a body portion of a container;
    a slot forming pitched threads on said container neck and being adapted to receive a thread from a complementary closure; and,
    a first and a second recess, said first recess disposed on a first side of said container neck and said second recess disposed on a second side of container neck, said first recess being juxtaposed by 180 degrees relative to said second recess, said first and second recess horizontally traversing said slot encircling said container neck;
    wherein said pitched threads on said container neck are 2 threads per inch.

* * * * *

UNITED STATES PATENT AND TRADEMARK OFFICE
CERTIFICATE OF CORRECTION

PATENT NO. : 6,561,369 B1  
DATED : May 13, 2003  
INVENTOR(S) : Christopher Clodfelter and Douglas Sprick It is certified that error appears in the above-identified patent and that said Letters Patent is hereby corrected as shown below:

Column 1,
Line 4, change "now U.S. Pat. No. 6,386,390" to -- now U.S. Pat. No. 6,386,380 --.

Signed and Sealed this

Eighteenth Day of November, 2003

JAMES E. ROGAN
*Director of the United States Patent and Trademark Office*